Figure 1:
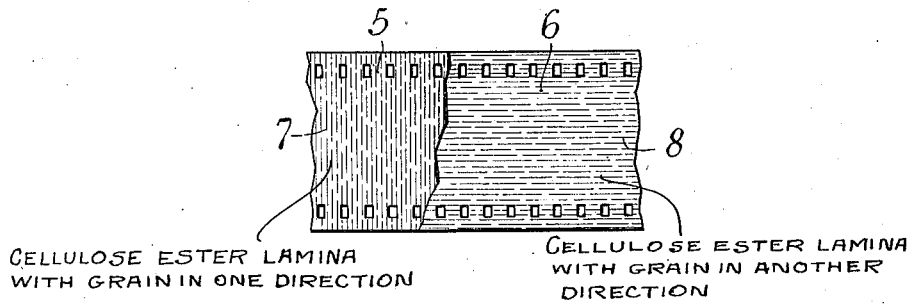

Dec. 9, 1930.                S. E. SHEPPARD ET AL                1,784,758

CELLULOSE FILM

Filed Feb. 2, 1929

CELLULOSE ESTER LAMINA
WITH GRAIN IN ONE DIRECTION

CELLULOSE ESTER LAMINA
WITH GRAIN IN ANOTHER
DIRECTION

CELLULOSE ESTER LAMINAE
WITH GRAIN IN ANOTHER
DIRECTION

CELLULOSE ESTER LAMINAE
WITH GRAIN IN ONE DIRECTION

Samuel E. Sheppard &
James G. McNally,
                    INVENTORS,

BY
                    ATTORNEY

Patented Dec. 9, 1930

1,784,758

UNITED STATES PATENT OFFICE

SAMUEL E. SHEPPARD AND JAMES G. McNALLY, OF ROCHESTER, NEW YORK, ASSIGNORS TO EASTMAN KODAK COMPANY, OF ROCHESTER, NEW YORK, A CORPORATION OF NEW YORK

CELLULOSE FILM

Application filed February 2, 1929. Serial No. 336,984.

This invention relates to cellulose ester and ether films and particularly to an improved film material which remains flat without the tendency to curl or roll.

Cellulose ester film, and especially cut films, are often handled with difficulty because the film rolls easily and will not normally remain flat. In certain applications this tendency is a distinct disadvantage which is not easily overcome. It is the object of the present invention to provide a novel film material having a laminated structure which does not curl or roll.

Cellulose ester film which has been stretched and dried under tension as described in our now pending application Serial No. 338,591, filed February 8, 1929, has a distinct grain. The mechanism of production of the grain and its explanation are not essential to the carrying out of the invention. However, by a distinct "grain" is meant a difference of physical properties in different directions. For example, the swelling or expansion in water, mechanical strength, and the flexibility, are such physical properties. A film possessing definite "grain" exhibits characteristic optical anisotropy or birefringence. It is probable that this "grain" is due to a definite orientation of molecules or micelles, that is, supermolecular particles, having one axis longer than the others, whereby the molecules or micelles in the grained condition have their long axes relatively parallel to each other, as compared with the random distribution in a material possessing no "grain" or anisotropy.

We have discovered that an improved film material can be prepared by laminating two or more layers of grained film so that the grain of the successive layers is transverse to each other substantially approaching a right angle. Thus a film material can be prepared for example by bringing together two sheets of grained cellulose ester film, such as cellulose acetate or cellulose nitrate film, and consolidating the sheets under pressure or otherwise so that the grain in one sheet is disposed at an angle to the grain in the other sheet. The consolidated material, consisting of the two layers autogenously united, displays no tendency to roll or curl, the tendency being resisted in both lateral directions by the graining in the separate laminae.

While the object of the invention is accomplished by the provision of two laminae united in a single sheet, it is possible to build up films consisting of more than two layers by similarly uniting the films with the graining of each successive sheet disposed at an angle to the graining of the underlying sheet. Such multiply material has the same non-curl properties and is useful for many purposes where a relatively rigid and flat film base is required.

Figure 2:
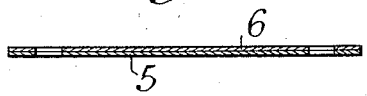

The invention will be better understood by reference to the accompanying drawing in which Figure 1 is a plane view of a fragment of the film material with one of the layers partially removed to exhibit the underlying layer and the graining thereof. Figure 2 is a sectional view of the film material and Figure 3 is a perspective view illustrating a multiply film material.

Referring to drawing, 5 and 6 indicate respectively two layers or plies of film. The graining is represented at 7 and 8. It will be understood that in the actual material the graining is not evident upon ordinary observation and does not affect materially the transparency of the film. The illustration is therefore merely diagrammatic to bring out clearly the relationship of the graining in the separate layers.

Figure 3:
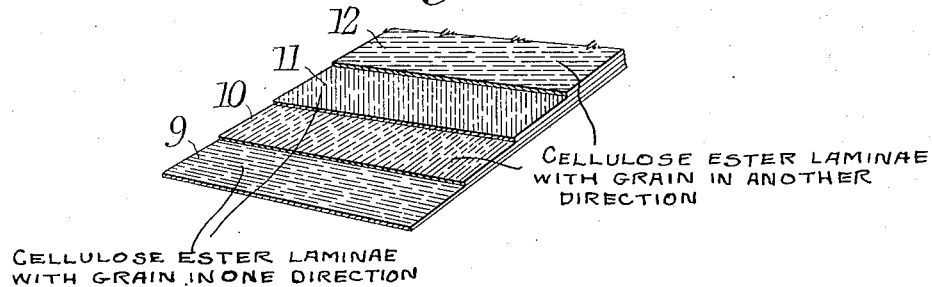

In Figure 3 we have illustrated a film material comprising separate layers or plies 9, 10, 11, and 12. It will be understood that the graining in layers 9 and 11 extends in one direction; whereas, the graining in layers 10 and 12 extends in a direction at right angles to the graining in layers 9 and 11.

The material as described can be prepared from cellulose films of any desired composition, such as cellulose acetate or cellulose nitrate. Such films can be prepared in accordance with the usual procedure, for example by dissolving a cellulose ester in a suitable solvent such as acetone with or without the addition of a softener or plastifier. Such films can be subjected to treatment for the purpose of producing a distinct grain therein; for example, by drying the films under tension from two opposite ends of the film. The film thus produced can be cut into sheets of any desired size and the separate sheets can be assembled then and subjected to pressure, for example in a hydraulic press. The sheet may be heated if desired sufficiently to make the film sufficiently plastic so that an autogenous bond between the separate laminæ is secured. The pressure can be released then. The film material thus produced is a homogeneous sheet comprising separate laminæ with a graining disposed in right-angular directions.

This material may be prepared also by joining separate sheets successively to a continuous strip or web of film. Thus a web of film delivered from the machine in which it is prepared and having the grain extending longitudinally thereof can receive successive separate sheets of film with the grain extending transversely of the web. The web carrying the added sheets can be conveyed through a hydraulic press and subjected to suitable pressure, with heat if necessary, to secure the autogenous bond and convert the single ply web into a web having two or more laminæ. Cementing material may or may not be used.

The product prepared by any of the procedures hereinbefore described is characteristically free from tendency to roll or curl. It provides therefore a suitable base for light-sensitive emulsions and may be utilized for other purposes to which it is adapted.

Various changes may be made in the details of the structure and in the procedure as described without departing from the invention or sacrificing any of its advantages.

Having thus described our invention, what we claim as new and desire to secure by Letters Patent is:

1. A substantially flat laminated cellulose ester film comprising at least two laminæ having the grain of one lamina at an angle to the grain of the adjacent lamina.

2. A substantially flat laminated cellulose nitrate film comprising at least two laminæ having the grain of one lamina at an angle to the grain of the adjacent lamina.

3. A substantially flat laminated cellulose ester film comprising at least two laminæ each of which have been grained in one direction by drying in a stretched condition, the grain of one lamina being at an angle to the grain of the adjacent lamina.

4. A substantially flat laminated cellulose nitrate film comprising at least two laminæ each of which have been grained in one direction by drying in a stretched condition, the grain of one lamina being at an angle to the grain of the adjacent lamina.

5. A substantially flat laminated cellulose ester film which is composed of at least two autogenously grained laminæ, the grain of one lamina being at an angle to the grain of the adjacent lamina.

6. A substantially flat laminated cellulose nitrate film which is composed of at least two autogenously grained laminæ, the grain of one lamina being at an angle to the grain of the adjacent lamina.

7. A substantially flat laminated cellulose acetate film comprising at least two laminæ having the grain of one lamina at an angle to the grain of the adjacent lamina.

8. A substantially flat laminated cellulose acetate film comprising at least two laminæ each of which have been grained in one direction by drying in a stretched condition, the grain of one lamina being at an angle to the grain of the adjacent lamina.

9. A substantially flat laminated cellulose acetate film which is composed of at least two autogenously grained laminæ, the grain of one lamina being at an angle to the grain of the adjacent lamina.

Signed at Rochester, New York, this 30th day of January, 1929.

SAMUEL E. SHEPPARD.
JAMES G. McNALLY.